United States Patent [19]

Stiefel et al.

[11] Patent Number: 6,126,069

[45] Date of Patent: *Oct. 3, 2000

[54] CHIP CARD, METHOD AND SYSTEM FOR USING AND PAYING FOR SERVICES

[75] Inventors: Rolf Stiefel, Gerlingen; Roland Sawatzki, Neu-Ulm; Ulrich Barth, Korntal-Münchingen, all of Germany

[73] Assignee: Alcatel, Paris, France

[*] Notice: This patent issued on a continued prosecution application filed under 37 CFR 1.53(d), and is subject to the twenty year patent term provisions of 35 U.S.C. 154(a)(2).

[21] Appl. No.: 08/796,810

[22] Filed: Feb. 6, 1997

[30] Foreign Application Priority Data

Feb. 9, 1996 [DE] Germany .................... 196 04 691

[51] Int. Cl.[7] ...................................... G06K 5/00
[52] U.S. Cl. .................... 235/380; 235/492; 380/227; 380/233
[58] Field of Search .................. 235/380, 381, 235/492; 380/227, 228, 229, 230, 231, 233; 705/52, 53

[56] References Cited

U.S. PATENT DOCUMENTS

| | | | |
|---|---|---|---|
| 4,323,921 | 4/1982 | Guillou | 380/231 X |
| 4,354,201 | 10/1982 | Sechet al. | 380/228 |
| 4,751,732 | 6/1988 | Kamitake | 380/20 |
| 4,755,660 | 7/1988 | Nakano | 235/380 |
| 4,804,825 | 2/1989 | Bitoh | 235/380 |
| 4,864,109 | 9/1989 | Minematsu et al. | 235/379 |
| 5,101,098 | 3/1992 | Naito | 235/475 |
| 5,144,663 | 9/1992 | Kudelski et al. | 380/230 |
| 5,237,157 | 8/1993 | Kaplan | 235/375 |
| 5,282,249 | 1/1994 | Cohen et al. | 380/23 |
| 5,325,431 | 6/1994 | Naruse | 380/16 |
| 5,509,073 | 4/1996 | Monnin | 380/229 |
| 5,563,948 | 10/1996 | Diehl et al. | 380/229 |
| 5,574,269 | 11/1996 | Mori et al. | 235/380 |
| 5,590,038 | 12/1996 | Pitroda | 235/380 X |
| 5,852,290 | 12/1998 | Chaney | 235/492 |

FOREIGN PATENT DOCUMENTS

| | | |
|---|---|---|
| 0380377 | 8/1990 | European Pat. Off. . |
| 3906349 | 9/1990 | Germany . |
| 4013147 | 10/1991 | Germany . |
| 4230866 | 3/1994 | Germany . |
| 4243851 | 6/1994 | Germany . |
| 4333388 | 4/1995 | Germany . |
| 2287565 | 9/1995 | United Kingdom . |

OTHER PUBLICATIONS

"Der Mikrorechner in der Briefasche" (The microcomputer in the wallet, Part 1 by Helmuth Lämme, Elektronik 20/1993, pp. 50 through 65 (1993, no month available).

*Primary Examiner*—Michael G Lee
*Assistant Examiner*—Jared J. Fureman
*Attorney, Agent, or Firm*—Ware, Fressola, Van Der Sluys & Adolphson LLP

[57] ABSTRACT

Anonymous use of and payment for, as well as collection of statistics, fee-based services, in particular Near-VOD services, employing a single chip card that can be used for all service providers. The chip card is used for paying for fee-based services of different service providers. Storage of usage-related data for collection of statistics and for payment for fee-based services as well as an authorization check is provided on the chip card. When an amount of money is loaded onto the chip card, these data are read and transmitted to a central office for the purpose of collecting statistics relating to the usage of individual services and crediting the individual service providers while, at the same time, guaranteeing anonymity of the individual customer-specific data.

15 Claims, 2 Drawing Sheets

CHIP CARD, METHOD AND SYSTEM FOR USING AND PAYING FOR SERVICES

TECHNICAL FIELD

The invention relates to a chip card for requesting and paying for fee-based services, a method for using a chip card for using fee-based services and a system therefor.

BACKGROUND OF THE INVENTION

Numerous applications for chip cards are known in the art. For example, a cash card or other so-called "electronic money" is known for shopping or for using services. It is possible to select from two possibilities: Prepaid "Debit Cards" wherefrom a certain value is directly deducted when it is used, and "Credit Cards" wherein the name of the bank and the owner's credit limit are stored. The amount will be deducted from a linked account when the card is used. With prepaid cards, e.g. with telephone cards, the respective amount is debited to the purchaser's card and credited to the dealer's card. The dealer can then go to his/her bank and have this amount credited to his/her bank account. Additional applications are so-called loading machines where the amount remaining on the chip card can be increased by payment of cash. An application therefor is, for example, chip cards for cafeteria lunches, beverages and food vending machines. In this case for example, a prepaid amount is credited to the card and this amount is subsequently decreased, like with a telephone card, or the amount will be deducted directly from the paycheck (from: "Der Mikrorechner in der Brieftasche", bei Chip-Karten hat Europa die Nase vorn (*"The microcomputer in the wallet", Europe is in first place with chip cards,* Part 1, by: Helmuth Lämme, Elektronik 20/1993). The aforedescribed conventional chip cards require that a backward channel is provided for the debit process. This backward channel is used to debit the card immediately or to make a note that a debit has occurred.

SUMMARY OF THE INVENTION

It is the object of the invention to provide the use of and payment for fee-based services of different service providers by way of a chip card.

The object is solved by a chip card for using and paying for fee-based services of different service providers (A, B, C), the chip comprising first means for decoding information sent by the selected fee-based service of the different service providers (A, B, C); a first memory for storing an amount for paying for the fee-based services; a second memory for storing of usage data of the fee-based services of the different service providers, in which second memory are stored a service provider identity, the fee-based service, start time and duration of the usage of the fee-based service, and the fee for using a fee-based service, and the chip card further comprising means for evaluating the information and for determining the cost of an actual fee-based service therefrom, and for reducing the amount which is stored in the first memory to pay for the fee-based services, by an amount equal to the cost.

Another object of the invention is a method for using fee-based services of different service providers, wherein a fee-based service is requested and information sent by the selected fee-based service is decoded with the help of a chip card, wherein data relating to a usage of the fee-based services and cost of the fee-based service are stored on the chip card, and wherein an amount of money is loaded onto the chip card at a loading station and the data relating to the usage are read and erased from the chip card, and wherein the read data are transmitted to a central office for further processing.

A still further object of the invention is a system for using the fee-based services of different service providers, the system comprising: a loading station for loading an amount of money onto a chip card and for reading and erasing data on the chip card, the chip card, having means for receiving a decoding a request of fee-based services of different service providers, a central office connected to the loading station for determining the amounts to be credited to the service providers depending on a respective usage.

It is advantageous in this case that no backward channel is required from the requesting station of the fee-based services to the fee-based server, or to the fee-based suppliers. It is an additional advantage of the invention that the user remains anonymous, because the individual usage data are read, for example, by equipment installed at the location of a trustee or sent to a central office where the data are evaluated without reference to the respective person who used the service. It is a further advantage that it is possible to use a single card for several service providers thereby providing considerable cost savings in supplying the cards. It is an additional advantage that exact statistics for each of the provided services can be collected which is important especially in the growing market for market research and suppliers.

BRIEF DESCRIPTION OF THE DRAWINGS

The invention will be discussed below with reference to the drawing and to embodiments. In the drawing is shown in.

BEST MODE FOR CARRYING OUT THE INVENTION

Figure 1:
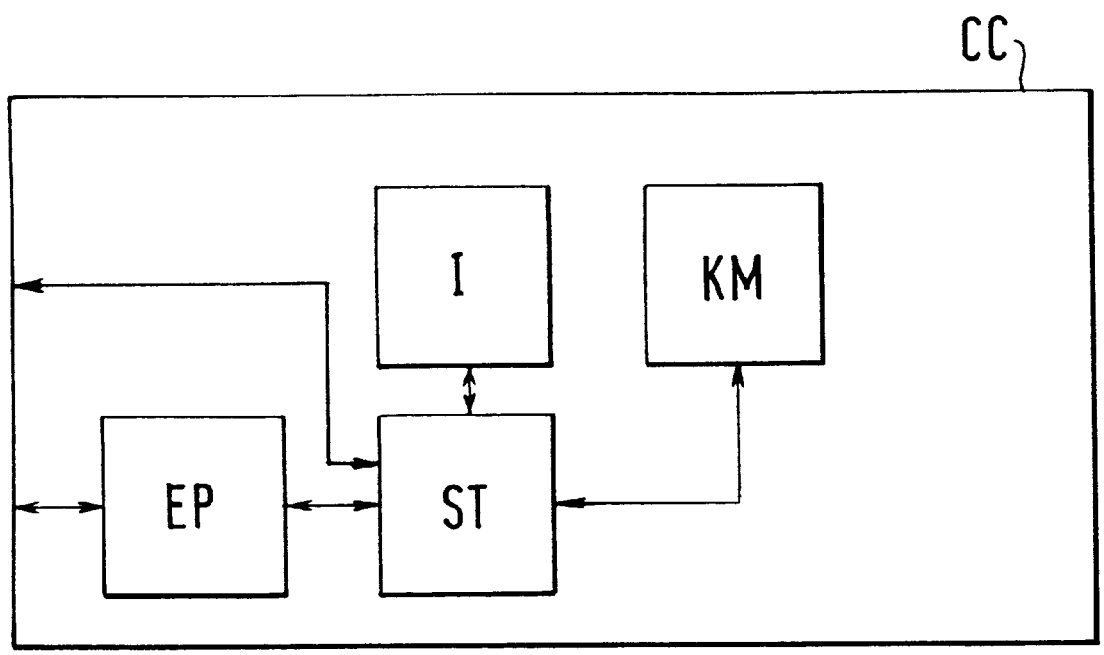
FIG. 1 a schematic representation of a chip card of the invention.

In the following, the invention will be discussed in greater detail with reference to FIG. 1 and to an embodiment.

A chip card CC for using and paying for fee-based services of different service providers A, B, C comprises the following means. On the chip card CC there is located a first means EP for decoding fee-based services selected and received from different service providers. This means will subsequently be called the decoding program. After a query, the chip card CC receives, in conjunction with the service to be rendered, authorization information and control information. The authorization information for authorizing access to fee-based services of different service providers A, B, C is decoded by the decoding program EP and evaluated further to determine if access to the fee-based service should be granted. For this, the authorization information which may, for example, comprise a service provider ID, a program number, a program key, an access information and a fee information, is evaluated and compared with stored access privileges. The information included therein is evaluated by a means ST which in the following will be called control unit.

In addition, there are located on the chip card CC a first memory I for storing an amount for paying for a fee-based service. This memory I may, for example, be a read/write memory where credit balances are added to and stored in. If the access information evaluated by the control unit ST agrees with the stored access privileges and if the credit balance stored in memory I is sufficient to cover the cost evaluated in the fee information, then the simultaneously received control information is evaluated with the decoding program EP. The control information comprises, e.g., time information relating to the use of the service and additional keys since a fee-based service is always encoded in sections, e.g. every 10 seconds and therefore has to be decoded in sections. The fact that the control information contains time information, has the advantageous result that immediately after termination of the use of the system or at least a short period of time thereafter, no additional cost is debited.

Furthermore, the card includes a second memory KM for storing data relating to the usage of the fee-based services of the different service providers A, B, C. In addition, there will be stored in the second memory KM for storing data relating to the usage of the fee-based services of the different service providers A, B, C which service was used and for which amount. In a further embodiment, these data may be stored in such a way that the service provider is stored first, followed by the fee-based service used, then the start time and duration of the usage of the fee-based service, and finally the cost itself of the fee-based service which was used.

The user him/herself shall not be stored in order to guarantee anonymous use. The manner in which the data are stored may, however, be arbitrarily changed at any time, and additional data may be added. In order to avoid that an excessively large amount of data is stored, the data may be compressed before being stored. The data enable the creation of statistics in order to enable the individual fee-based service providers to identify which service is being used frequently or less frequently.

In the following, it will be discussed how a method for using fee-based services from different service providers may be designed (no figure). A method for using fee-based services from different service providers A, B, C comprises the following steps:

A fee-based service is requested by a requesting system by inserting a chip card CC, for example, via a set-top box. The requested fee-based service is sent in encoded form and provided to the requesting system. In the encoded service, there is included, aside from the respective program content, additional information, the so-called control information and the authorization information. The authorization information transmitted in conjunction with the requested fee-based service is decoded by the chip card CC. For decoding purposes, for example, a specific key issued by a trustee, for example by a bank, may be used. The authorization information may contain, for example, aside from the information specific to the service provider, also a program key, access information, fee information, etc. Subsequently, the access information is evaluated, and it is determined if the chip card CC and correspondingly its owner is entitled to request this service, or if there is still sufficient money stored on the card for paying for said fee-based service. Then the control information which, among others, includes information about the actual usage time, is decoded. Since in one embodiment the fee-based services are encoded in sections, decoding will have to be executed using these same sections. After the selection and after positive decoding, data relating to the usage of the fee-based services and the incurred cost associated with the fee-based services are stored on the chip card CC. Since data relating to the usage and the incurred cost can be stored directly on the chip card, a backward channel does not have to be provided.

In order to always provide a sufficiently large credit balance for payment for services, a certain amount of money may be loaded onto the chip card CC at a loading station LS. This may be accomplished by cash payment, by credit card payment or by money transfer. At the same time, when the amount of money is loaded, the data related to usage are read and these data are subsequently erased on the chip card CC. The data so read are transmitted to a central office Z for further processing. In the central office Z, the data are used to determine the values of the fee based services provided by each service provider. At the same time, the payable amounts are credited to the individual service providers A, B, C.

Figure 2:
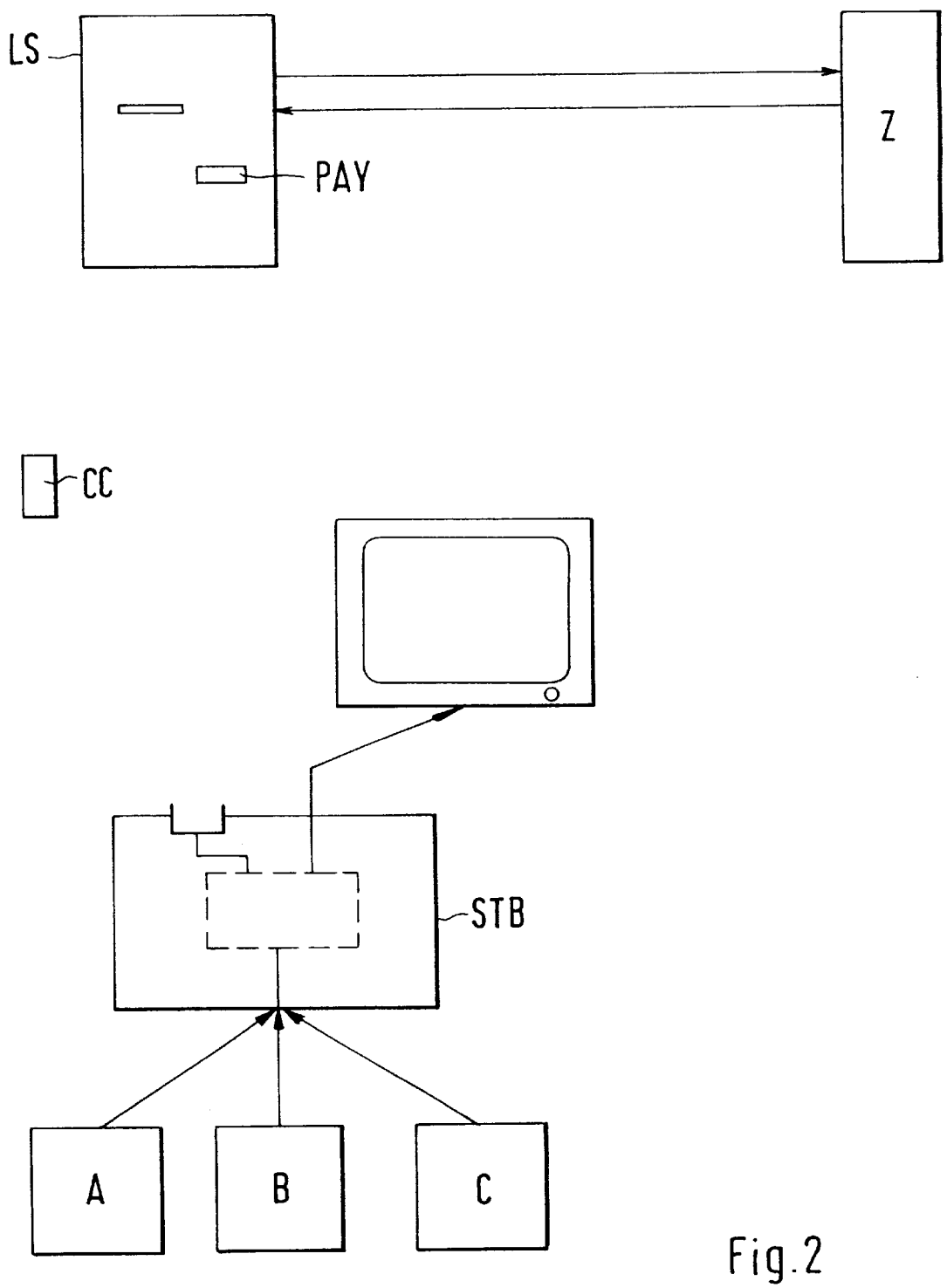
FIG. 2 a schematic representation of a system according to the invention for using fee-based services.

In the following, a system for using fee-based services from different service providers will be discussed in greater detail with reference to FIG. 2.

A system for using fee-based services comprises several service providers A, B, C. The different service providers may be provided to a user either directly or via a server used by the different service providers A, B, C to access a user. The user accesses the fee-based services of the different service providers A, B, C via an auxiliary device STB, a so-called set-top box. The set-top box STB is either an auxiliary device or integrated, for example, into a television set. Also part of the system for using fee-based services is a loading station LS for loading a certain amount of money onto a chip card CC. This loading station LS for loading money may be located inside a bank or, like automated teller machines, in the anteroom of a bank, or at the location of another trustee. The chip card CC is inserted into the loading station LS and, for example, cash may be inserted into an input slot PAY for crediting that amount of cash onto the card. Any other form of crediting money, e.g. a money transfer or payment by credit card may, of course, also be provided. A further part of the system is the chip card CC which is used to request the different fee-based services and also to decode the transmitted encoded fee-based services from the different service providers A, B, C. A central office Z linked to the loading station LS also forms part of the system. The link between the loading station and the central office Z must have a backward channel. At the same time, when the chip card CC is inserted into the loading station LS for loading an amount of money, data relating to the usage of the fee-based services are read from the card and transmitted to the central office Z. The data are used in the central office Z for determining the amount of money to be credited to the individual service providers as a result of the respective usage. In addition, statistics may be generated in the central office Z since it is there where the usage and frequency of usage, respectively, of the individual services is collected.

Consequently, there is provided a system for using fee-based services from different service providers A, B, C wherein no backward channel is required for debiting money for actually using a service. For loading an amount of money onto the chip card, however, a backward channel must be available. This simplifies the application of fee-based services. A preferred area for applying this type of service, the chip card and the system is a distribution service, more accurately NVOD, the Near-Video-on-Demand. NVOD is a distribution-oriented VOD variant. In this VOD variant, only a minimum of control functionality and no arbitration function is required. Nevertheless, application of the system and the chip card should not be restricted to NVOD, but should also be applicable to additional fee-based services, such as the distribution services known under the catchwords 'Pay per View' or Pay per Channel'. The chip card CC and a corresponding system may also be employed in fee-based retrieval systems, e.g. a mail box system. At this time, a mail box system itself is not a fee-based service, but such a service may conceivably be offered in the future from a large mail box as a fee-based service.

What is claimed is:

1. A chip card for a user to use and pay for fee-based services of different service providers (A, B, C), the chip card comprising:

first means (EP) for decoding information sent by the selected fee-based service of the different service providers (A, B, C), a first memory (I) for storing an aggregate amount for paying for the fee-based services of any of the different service providers (A, B, C), a second memory (KM) for storing usage data of the fee-based services of the different service providers (A, B, C) so as to eliminate a need for a backward channel to the different service providers (A, B, C) in order to use the chip card for fee-based services, wherein the second memory (KM) stores:

a service provider identity, the fee-based service, start time and duration of the usage of the fee-based service, and a fee charged to the user for using a fee-based service, the chip card further storing cost associated with the fee-based services incurred to a card company (Z) and comprising means (ST) for evaluating stored data and for determining cost of an actual fee-based service therefrom, and for reducing the aggregate amount which is stored in the first memory by an amount equal to the cost, wherein the aggregate amount is loaded at a loading station which has no backward channel to the fee-based service providers (A, B, C) and wherein the loading station has a backward channel linking to the card company (Z) so as to allow the card company (Z) to determine payable amounts to be credited to the different service providers based on a respective usage and the cost stored on the chip card.

2. A chip card according to claim 1, wherein the first means (EP) for decoding decodes authorization information and control information.

3. A chip card according to claim 2, wherein the fee-based service is a fee-based distribution service or a fee-based retrieval service.

4. A chip card according to claim 1, wherein the fee-based service is a fee-based distribution service or a fee-based retrieval service.

5. The chip card according to claim 1, wherein the fee-based services of different service providers (A, B, C) are provided directly to a user of the chip card.

6. A method for a user to use and pay for fee-based services of different service providers (A, B, C), wherein a fee-based service is requested and information sent by the selected fee-based service is decoded with the help of a chip card (CC) having a memory (KM), wherein data relating to a usage of the fee-based services, a fee charged to the user for using a fee-based service, and cost of the fee-based service incurred to a card company (Z) are stored in the memory (KM) of the chip card (CC) so as to eliminate a need for a backward channel to the different service providers (A, B, C) in order to use the chip card for fee-based services, and wherein an aggregate amount of money is loaded onto the chip card (CC) at a loading station (LS) which has no backward channel to the fee-based service providers (A, B, C) for paying for services provided by any of the different service providers (A, B, C) and data relating to the usage are read and erased from the chip card, and wherein the read data are transmitted to the card company (Z) so as to allow the card company (Z) to determine payable amounts to be credited to the different fee-based service providers (A, B, C) based on a respective usage and the cost stored in the chip card.

7. The method of claim 6, wherein the fee-based services of a service provider are evaluated and the respective service provider is credited for providing the services according to their usage.

8. The method according to claim 6, wherein the use of the fee-based services of different service providers (A, B, C) is anonymous to the fee-based service providers (A, B, C).

9. The method according to claim 6, wherein the fee-based services of different service providers (A, B, C) are provided directly to a user of the chip card.

10. The method according to claim 9, wherein the fee-based services of different service providers (A, B, C) are accessed by the user via an auxiliary device (STB).

11. A system for using fee-based services of different service providers (A, B, C), the system comprising:

a chip card (CC) to be used by a user, having means for receiving and decoding a request of fee-based services of different service providers (A, B, C), a first memory, and a second memory for storing usage data of the fee-based services of any of the different service providers (A, B, C), a fee charged to the user for using a fee-based service, and cost of the fee-based service incurred to a card company (Z) so as to eliminate a need for a backward channel to the different service providers in order to use the chip card for fee-based services, a loading station (LS) for loading an aggregate amount onto the first memory of the chip card (CC) for paying for services provided by any of the different service providers (A, B, C) and for reading and erasing usage data of the fee-based services of the different service providers (A, B, C) from the second memory of the chip card (CC), wherein the loading station has no backward channel to the fee-based service providers (A, B, C) and wherein the loading station has a backward channel linking to the card company (Z) so as to allow the card company (Z) to determine payable amounts to be credited to the service providers depending on a respective usage and the cost stored on the chip card.

12. The system according to claim 11, wherein a statistics is collected in the card company (Z) for specifying a usage frequency of individual services.

13. A system for using the fee-based services of different service providers (A, B, C), the system comprising:

a chip card (CC), having means for receiving and decoding a request of fee-based services of different service providers (A, B, C), a first memory, and a second memory for storing usage data of the fee-based services of any of the different service providers (A, B, C), a fee charged to the user for using a fee-based service, and cost of the fee-based service incurred to a card company (Z) so as to eliminate a need for a backward channel to the different service providers in order to use the chip card for fee-based services and to guarantee anonymous use;

a loading station (LS) for loading an aggregate amount onto the first memory of the chip card (CC) for paying for services provided by any of the different service providers (A, B, C) and for reading and erasing usage data of the fee-based services of the different service providers (A, B, C) from the second memory of the chip card (CC), and wherein the card company (Z) is connected to the loading station (LS) for determining amounts to be credited to the service providers depending on respective usage.

14. The system according to claim 13, wherein the fee-based services from different service providers are directly provided by the service providers to a user of the chip card.

15. The system according to claim 14, wherein the fee-based services from different services providers are accessible by an auxiliary device (STB).

* * * * *